United States Patent [19]

Andree et al.

[11] 4,179,393

[45] Dec. 18, 1979

[54] STABLE AQUEOUS SUSPENSION OF WATER-INSOLUBLE, CALCIUM-BINDING ALUMINOSILICATES AND ORGANIC SUSPENDING AGENTS

[75] Inventors: Hans Andree; Dieter Jung, both of Hilden; Martin Bischoff, Gelsenkirchen; Jens Conrad, Hilden; Josef Huppertz, Dusseldorf-Holthausen; Günter Jakobi, Hilden; Peter Krings, Krefeld; Dieter Kühling, Monheim; Herbert Reuter, Hilden; Wolfgang Rupilius, Dusseldorf; Horst Rutzen, Langenfeld; Harald Schnegelberger, Leichlingen, all of Fed. Rep. of Germany

[73] Assignee: Henkel Kommanditgesellschaft auf Aktien (Henkel KGaA), Dusseldorf-Holthausen, Fed. Rep. of Germany

[21] Appl. No.: 764,854

[22] Filed: Feb. 2, 1977

[30] Foreign Application Priority Data

Feb. 6, 1976 [AT] Austria .................................. 841/76

[51] Int. Cl.$^2$ ........................ C01B 33/28; C11D 1/44; C11D 1/48; C11D 3/12

[52] U.S. Cl. .................................... 252/155; 252/119; 252/174.25; 252/120; 252/140; 252/173; 252/179; 252/193; 252/313 R; 252/357; 252/529; 252/548; 260/583 P; 260/584 R; 260/584 B; 568/620

[58] Field of Search ................. 252/89, 119, 120, 140, 252/155, 179, 313 R, 357, 529, 548; 260/583 P, 584 R, 584 B, 611 B, 614 R, 615 R, 615 B

[56] References Cited

U.S. PATENT DOCUMENTS

| | | | |
|---|---|---|---|
| 2,695,314 | 11/1954 | Kosmin | 252/357 |
| 3,240,819 | 3/1966 | Gaertner | 260/615 |
| 3,254,034 | 5/1966 | Dwyer | 252/430 |
| 3,697,423 | 10/1972 | Sundby | 252/110 |
| 3,741,912 | 6/1973 | Kaneko | 252/529 |
| 3,945,996 | 3/1976 | Conrad | 260/239.3 R |
| 4,018,720 | 4/1977 | Lengyel | 252/534 |
| 4,072,622 | 2/1978 | Kuhling | 252/179 |

*Primary Examiner*—Dennis L. Albrecht
*Attorney, Agent, or Firm*—Hammond & Littell

[57] ABSTRACT

Stable, pumpable, aqueous suspensions of water-insoluble, calcium-binding aluminosilicates suitable as stock suspensions comprising (A) from 20% to 55% by weight of at least one finely-divided, water-insoluble silicate compound having a calcium-binding power of at least 50 mg CaO/gm of anhydrous active substance and having the formula, combined water not shown $$(M_{2/n}O)_x \cdot Me_2O_3 \cdot (SiO_2)_y$$

where M is a cation of the valence n, exchangeable with calcium, x is a number of from 0.7 to 1.5, Me is aluminum or boron, and y is a number from 0.8 to 6, (B) from 0.2% to 5% by weight of at least one organic dispersing agent as follows:

(1) lower alkylene oxide or glycide adducts of an N-higher alkyl/alkenyl-alkylenediamine,
(2) lower alkylene oxide or glycide adducts of the reaction product of ε-caprolactam with an N-mono- or di-higher alkyl/alkenyl-alkylenediamine,
(3) ethylene or propylene oxide adducts of long chain vicinal aminoalkanols,
(4) the reaction product of ethylene glycol and a higher epoxyalkane and ethylene oxide adducts thereof.

19 Claims, No Drawings

STABLE AQUEOUS SUSPENSION OF WATER-INSOLUBLE, CALCIUM-BINDING ALUMINOSILICATES AND ORGANIC SUSPENDING AGENTS

RELATED ART

As known, the detergents used in the household, in commerical establishments and in industry, frequently contain large quantities of condensed phosphates, particularly tripolyphosphates. These are provided to sequester the hardness formers of tap water and are responsible to a great extent for increasing the cleaning power of the capillary-active washing substances. The phosphorus content of these agents has been critized by the public in connection with questions of the protection of the environment. The view is frequently expressed that the phosphates, which arrive in the rivers and lakes after treatment of the sewage, have great influence on the eutrophication of the waters and is said to lead to an increase of the growth of algae and of oxygen consumption. It has, therefore, been tried to eliminate phosphate from the washing and cleaning processes or from the agents used for this purpose, or at least to substantially reduce its proportion.

Copending, commonly-assigned U.S. patent application Ser. No. 458,306, filed Apr. 5, 1974, now abandoned in favor of its continuation application Ser. No. 800,308, filed May 25, 1977, now abandoned in favor of its continuation-in-part application Ser. No. 956,851, filed Nov. 2, 1978, and its CIP application Ser. No. 599,012, filed July 24, 1975, now abandoned, discloses a process for the washing, bleaching or cleaning of solid materials, particularly textiles, by treating these materials with a liquor containing compounds able to bind the cations that make water hard. The process is characterized in that finely-dispersed, water-insoluble silicate compounds having calcium binding capacity of at least 50 mg CaO/gm of anhydrous active substance (AS) and having the Formula I, combined water not shown $$(M_{2/n}O)_x \cdot Me_2O_3 \cdot (SiO_2)_y \qquad (I)$$

where M is a cation of the valence n, exchangeable with calcium, x is a number from 0.7 to 1.5, Me is aluminum or boron, and y is a number from 0.8 to 6, preferably from 1.3 to 4, are suspended in the aqueous treatment bath. The process of the patent makes possible the complete or partial replacement of phosphates that bind calcium ions by complexing and are still being used in the washing and cleaning process.

The calcium-binding capacity of the above-defined compounds may reach values of 200 mg CaO/gm AS and is preferably in the range of 100 to 200 mg CaO/gm AS. The above-defined compounds capable of binding calcium are referred to as "aluminosilicates" in the following text, for the sake of simplicity. This applies particularly to the sodium aluminosilicates that are to be used preferably. All data given for their preparation and processing apply accordingly to the totality of the above aluminosilicate compounds as defined in said earlier application.

The cation M employed is preferably sodium. However, the same can also be totally or partially replaced by other cations exchangeable with calcium, such as hydrogen, lithium, potassium, ammonium or magnesium, as well as by the cations of water-soluble organic bases, for example, by those of primary, secondary or tertiary alkylamines or alkylolamines with not more than 2 carbon atoms per alkyl radical, or not more than 3 carbon atoms per alkylol radical.

The anhydrous active substance (AS) of the aluminosilicates is that reached after one hour of drying at 800° C., whenever reference to anhydrous aluminosilicate is made in the following text. The adhering water as well as the water of retention is removed practically completely by this drying.

Aluminosilicates that are still moist, for example, from their preparation, are used to advantage as starting compounds in the preparation of washing and cleansing agent compositions containing the above-defined aluminosilicates in addition to the conventional components. The moist compounds are at least mixed with a portion of the remaining components of the material to be prepared, and the mixture is incorporated into the finished washing and cleansing agent composition to give as the final product, a product that is a pourable powder.

The aluminosilicates are supplied or used, in the framework of the procedure for the preparation of washing and cleansing agent compositions outlined above, as aqueous suspensions or as moist filter cake. Certain improvements of the suspension characteristics, such as the stability of the suspension and the transferability of the aluminosilicates dispersed in the aqueous phase, by pumping, would be desirable.

U.S. patent application Ser. No. 620,387, filed Oct. 7, 1975, now U.S. Pat. No. 4,072,622, and commonly assigned, discloses an aqueous suspension of water-insoluble, calcium-binding aluminosilicates with an improved stability against settling consisting essentially of (A) from 20% to 50% by weight on the anhydrous basis of at least one finely-divided, water-insoluble silicate compound having a calcium binding power of at least 50 mg CaO/gm of anhydrous active substance and having the formula, combined water not shown $$(M_{2/n}O)_x \cdot Me_2O_3 \cdot (SiO_2)_y$$

where M is a cation of the valence n, exchangeable with calcium, x is a number of from 0.7 to 1.5, Me is aluminum or boron, and y is a number from 0.8 to 6 and (B) from 0.5% to 6% by weight of at least one organic dispersing agent selected from the group consisting of the free acids and alkali metal salts of:

(1) an organic, macromolecular polymer with carbonyl and/or hydroxy groups,
(2) an organic phosphonic acid having at least one further acid group selected from the group consisting of phosphonic acid and carboxyl,
(3) an alkyl acid phosphate emulsifier having from 3 to 30 carbon atoms in the alkyl,
(4) a nonionic surface-active compound having a turbidity point in aqueous butoxyethoxyethanol according to DIN 53917 of below 90° C., and
(5) an anionic surface-active sulfonate, in water.

OBJECTS OF THE INVENTION

An object of the present invention is the development of stable, pumpable aqueous suspensions of water-insoluble, calcium-binding aluminosilicates suitable as stock suspensions consisting essentially of:

(A) from 20% to 55% by weight on the anhydrous basis of at least one-finely divided, water-insoluble silicate compound having an average particle size in the range of from 0.1μ to 100μ and a calcium-binding power of from 50 to 200 mg CaO/gm of anhydrous substance and having the formula, combined water not shown $$(M_{2/n}O)_x.Me_2O_3.(SiO_2)_y$$

wherein M is a cation of the valence n, exchangeable with calcium, n is an integer from 1 to 2, x is a number from 0.7 to 1.5, Me is a member selected from the group consisting of aluminum and boron, and y is a number from 0.8 to 6, (B) from 0.2% to 5% by weight of at least one organic dispersing agent selected from the group consisting of:

(1) the adduct of an oxide selected from the group consisting of 1 to 3 mols of ethylene oxide, 1 to 3 mols of propylene oxide and 0.5 to 3 mols of glycide onto 1 mol of a diamine of the formula $$R—NH—(CH_2)_k—NH_2$$

wherein R is a member having from 8 to 24 carbon atoms selected from the group consisting of alkyl and alkenyl and k is an integer from 2 to 6, (2) the adduct of from 0.5 to 3 mols of an oxide selected from the group consisting of ethylene oxide, propylene oxide and glycide onto 1 mol of the reaction product of 1 to 10 mols of ε-caprolactam with 1 mol of a diamine of the formula

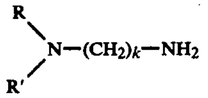

wherein R and k have the above assigned values and R' is a member selected from the group consisting of hydrogen and alkyl having from 1 to 4 carbon atoms, (3) hydroxyalkyl amines of the formula

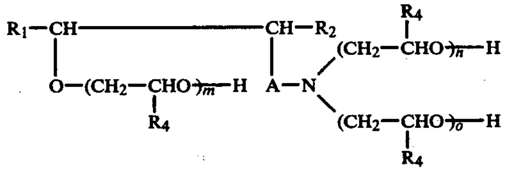

wherein $R_1$ is alkyl having 1 to 16 carbon atoms, $R_2$ is a member selected from the group consisting of hydrogen and alkyl having 1 to 16 carbon atoms, and the sum of the carbon atoms in $R_1+R_2$ is from 6 to 20 with the proviso that when $R_2$ is H, $R_1$ is alkyl having 6 to 16 carbon atoms, $R_4$ is a member selected from the group consisting of hydrogen and methyl, m, n and o represent integers from 0 to 3 and A is a bridging bond selected from the group consisting of:

(a) a single bond between the carbon and the nitrogen, (b)

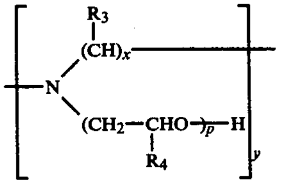

-continued (c)

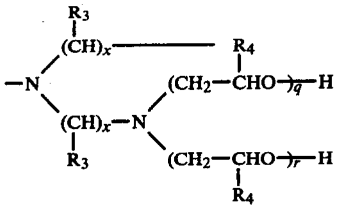

and (d)

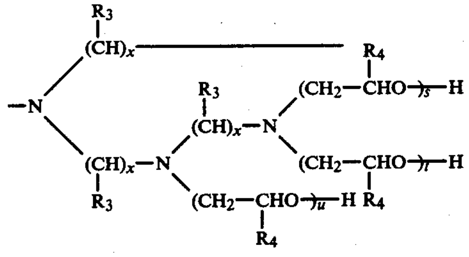

wherein $R_3$ is a member selected from the group consisting of hydrogen and methyl, x is an integer from 2 to 6, y is an integer from 1 to 3, p, q, r, s, t, and u represent integers from 0 to 3, preferably at least one of m to u is 1, and, when $R_4$ is methyl uniformly in all occurrences, the sum of m to u does not exceed 5, and (4) an alcohol selected from the group consisting of (e) an adduct of 1 mol of ethylene glycol with 1 mol of a vic-epoxyalkane having 8 to 22 carbon atoms, and (f) an adduct of 1 to 6 mols of ethylene oxide therewith, and (C) water.

Another object of the invention is the development of a process for the preparation of washing and cleansing agent compositions employing the above suspensions.

These and other objects of the present invention will become more apparent as the description thereof proceeds.

DESCRIPTION OF THE INVENTION

We have now found that certain compounds possess to a special degree, the capability to stabilize suspensions of the above calcium-binding aluminosilicates so that these, even with a high solids content, remain stable for a long time, in fact, for a practically unlimited time, and also can still be pumped without problems after long periods of standing. Surprisingly, it has been found that there are certain compounds which are capable of keeping suspensions of moist aluminosilicates which have a bound or adhering water content of 70% or less, pumpable practically, independent of their standing period, which was impossible until now.

The present invention, therefore, relates to stable, pumpable aqueous suspensions of water-insoluble, calcium-binding aluminosilicates, suitable for use as stock suspensions, characterized by the fact that, based on the total weight of the aqueous suspension, they contain (A) 20% to 55% by weight on an anhydrous basis of finely-divided, water-insoluble compounds, capable of binding calcium, of the general formula, combined water not shown $$(M_{2/n}O)_x.Me_2O_3.(SiO_2)_y \quad (I)$$

in which the symbols have the meaning given above, and (B) from 0.2% to 5.0% by weight of at least one dispersing agent from the group of the following compounds:

(1) The adduct of an oxide selected from the group consisting of 1 to 3 mols of ethylene oxide, 1 to 3 mols of propylene oxide and 0.5 to 3 mols of glycide onto 1 mol of a diamine of the formula $$R—NH—(CH_2)_k—NH_2$$

wherein R is a member having from 8 to 24 carbon atoms selected from the group consisting of alkyl and alkenyl and k is an integer from 2 to 6, (2) the adduct of from 0.5 to 3 mols of an oxide selected from the group consisting of ethylene oxide, propylene oxide and glycide onto 1 mol of the reaction product of 1 to 10 mols of ε-caprolactam with 1 mol of a diamine of the formula

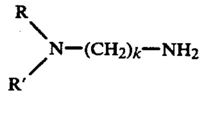

wherein R and k have the above assigned values and R' is a member selected from the group consisting of hydrogen and alkyl having from 1 to 4 carbon atoms, (3) hydroxyalkyl amines of the formula

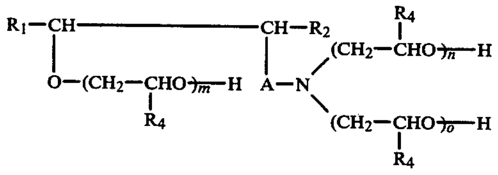

wherein $R_1$ is alkyl having 1 to 16 carbon atoms, $R_2$ is a member selected from the group consisting of hydrogen and alkyl having 1 to 16 carbon atoms, and the sum of the carbon atoms in $R_1+R_2$ is from 6 to 20 with the proviso that when $R_2$ is H, $R_1$ is alkyl having 6 to 16 carbon atoms, $R_4$ is a member selected from the group consisting of hydrogen and methyl, m, n and o represent integers from 0 to 3 and A is a bridging bond selected from the group consisting of:

(a) a single bond between the carbon and the nitrogen,

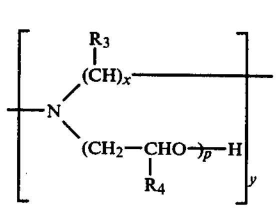

(b)

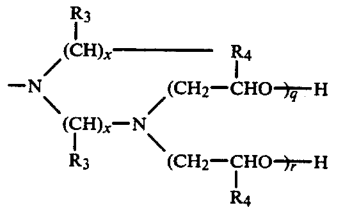

(c)

-continued

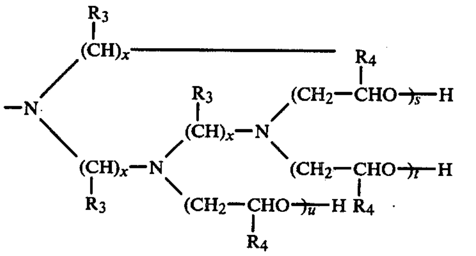

and (d)

wherein $R_3$ is a member selected from the group consisting of hydrogen and methyl, x is an integer from 2 to 6, y is an integer from 1 to 3, p, q, r, s, t, and u represent integers from 0 to 3, preferably at least one of m to u is 1, and, when $R_4$ is methyl uniformly in all occurrences, the sum of m to u does not exceed 5, and (4) an alcohol selected from the group consisting of (e) an adduct of 1 mol of ethylene glycol with 1 mol of a vic-epoxyalkane having 8 to 22 carbon atoms, and (f) an adduct of 1 to 6 mols of ethylene oxide therewith, and (C) water.

The pH of the suspensions is generally between about 7 and 12, preferably between 8.5 and 11.5, and usually below 11.

The above-mentioned compounds are the main and essential components of the suspensions according to the invention. However, additional components may be contained, such as the so-called dissolving intermediaries (or solution aids), i.e., compounds that improve the solubility of the added dispersing agents in the aqueous phase. The addition of dissolving intermediaries is generally unnecessary; but it may be indicated if the concentration of the dispersing agent according to B1 to B4 above, which is sparcely soluble in water, is higher than about 1%. The amount of the dissolving intermediary in the total suspension can be, for example, of the same order of magnitude as the amount of the stabilizing or dispersing agents of B. Compounds suitable as dissolving intermediaries are generally known to the man skilled in the art. These include solvents, such as dimethyl sulfide, and hydrotropic agents, such as benzene sulfonic acid, toluene sulfonic acid, xylene sulfonic acid, or their water-soluble salts. Octyl sulfate can also be used.

The condition of the aluminosilicate reached after one hour of drying at 800° C. is the basis on which all data of "concentration of the aluminosilicates", "solids content" or content of "active substance" (AS) are based. The adhering water and water of retention is removed practically completely by this drying procedure.

All data in percentages are referring to percent by weight.

The above-mentioned components A and B are discussed in more detail below.

The aluminosilicates of component A to be used according to the invention may be x-ray amorphous or crystalline products, with the use of mixtures of amorphous and crystalline products as well as partially crystallized products being permissible. The aluminosilicates may be naturally occurring or synthetically produced products. However, the synthetically prepared products are preferred.

Their preparation can be carried out, for example, by reacting water-soluble silicates with water-soluble aluminates in the presence of water. Preferably, sodium silicates and sodium aluminates are employed. For this purpose, aqueous solutions of the starting materials can be mixed or one component in solid form can be reacted with the other component present in an aqueous solution. The desired aluminosilicates may also be obtained by mixing the two components in solid form, in the presence of water. Aluminosilicates are also produced by reacting $Al(OH)_3$, $Al_2O_3$ or $SiO_2$ with alkali metal silicate or alkali metal aluminate solutions, respectively. The preparation may be carried out according to other well known processes, also. The invention refers, in particular, to aluminosilicates possessing, in contrast to the layered silicate structure of montmorillonite, a three-dimensional spatial lattice structure.

The preferred calcium-binding capacity, which is in the range of 100 to 200 mg CaO/gm AS and mainly about 100 to 180 mg CaO/gm AS, is found principally in compounds of the following composition:

$0.7\text{–}1.1Na_2O.Al_2O_3.1.3\text{–}3.3SiO_2$.

This formula includes two different types of crystal structures (or their non-crystalline precursors) that differ also in their formulas:

(a) $0.7\text{–}1.1Na_2O.Al_2O_3.1.3\text{–}2.4SiO_2$ (b) $0.7\text{–}1.1Na_2O.Al_2O_3.>2.4\text{–}3.3SiO_2$.

The different crystal structures become apparent in the x-ray diffraction diagram.

The amorphous or crystalline aluminosilicate, present in an aqueous suspension can be separated from the remaining aqueous solution be filtration and drying at temperatures of 50° C. to 400° C. The product contains a larger or smaller amount of combined water, depending on the drying conditions.

The higher drying temperatures are not generally recommended. It is preferable that a temperature of 200° C. is not exceeded in drying, when the aluminosilicate is to be used in washing and cleansing agent compositions. However, the aluminosilicates do not have to be dried at all after their preparation, if they are used for the preparation of a suspension according to the invention. On the contrary, and this is especially advantageous, an aluminosilicate that is still moist from its preparation may be used. Also suitable for the preparation of suspensions according to the invention are aluminosilicates that are dried at intermediate temperatures of 80° to 200° C., until the adhering liquid water is removed.

The particle size of the aluminosilicate particles may vary between 0.01μ and 0.1 mm. This is based on the primary particle size, i.e., to the size of the particles obtained by precipitation and, if desired, subsequent crystallization. Especially advantageous is the use of aluminosilicates consisting to at least 80% by weight of particles measuring 10 to 0.01μ, particularly 8 to 0.1μ. It is preferable that these aluminosilicates do not contain any primary or secondary particles with a diameter above 30μ. Secondary particles are particles that are produced by the agglomeration of primary particles into larger forms. Most important is the range between ca. 1 and 10μ.

The use of aluminosilicates still moist from their preparation, for the production of suspensions according to the invention, has been especially advantageous with respect to the agglomeration of primary particles into larger forms, since it was found that a formation of secondary particles is practically completely prevented by the use of these moist products.

A more detailed description of the compounds used as component B according to the invention follows.

The addition products, designated as substance B1, of 1 to 3 mols of ethylene oxide or propylene oxide or 0.5 to 3 mols of glycide onto 1 mol of a mono-substituted N-(alkyl/alkenyl)-alkane diamine are known products which were obtained by reacting an alkane diamine, such as ethane diamine, 1,2- and 1,3-propane diamine, 1,4-butane diamine, 1,5-pentane diamine or 1,6 -hexane diamine, substituted with a higher alkyl or alkenyl group, with the corresponding alkylene oxide in the absence of a catalyst. (See Houben-Weyl: "Methoden der organischen Chemie", 4th Ed., XI/1, pp. 311–314 [1957] or U.S. Pat. No. 2,695,314.) Instead of the designation "alkane diamine", the designation "alkylene diamine" is also used, that is, the designations ethylene diamine, propylene-diamine, hexamethylene diamine, etc. In the case of propylene diamine, we have to distinguish between 1,2 and the 1,3 derivative. Preferred in the present case are the alkoxylation products of an N-monosubstituted higher alkyl- or alkenyl-1,3-propylene diamine. The corresponding N-(2-hydroxyalkyl)-derivatives are produced in the reaction with 3 mols or less than 3 mols of alkylene oxide by the reaction with the three existing hydrogen atoms on the two amino groups. There is practically no formation of polyalkylene glycol ether chains under the reaction conditions.

The alkyl or alkenyl groups of the compounds according to B-1 have 8 to 24, preferably 12 to 18, carbon atoms. Preferred are the straight-chained, saturated or unsaturated aliphatic groups, such as lauryl, myristyl, palmityl, palmitoleyl, stearyl, oleyl, behenyl, etc. In practice compounds with certain chain length distribution of these groups, as they are obtained in the preparation of natural fatty acid mixtures and their hydrogenated products, are preferred. Instead of the fatty amines from natural sources, other primary amines with a corresponding hydrocarbon radical, can be used as a starting material, for example, the primary alkyl amines obtained by nitrating straight-chained paraffins to give non-terminal nitroparaffins and reducing the nitro-group. Typical representatives of substance class B-1 are, for example, the compounds:

N-dodecyl-1,3-propane diamine+1 EO,
N-dodecyl-1,3-propane-diamine+2 EO,
N-cocoalkyl-1,3-propane diamine+1 PO,
N-cocoalkyl-1,3-propane diamine+2 PO,
N-tallow-alkyl-1,3-propane diamine+3 EO,
N-tetradecyl-1,3-ethane diamine+2 EO
(EO=ethylene oxide, PO=propylene oxide), and
N-cocoalkyl-1,3-propane diamine+1 glycide.

Cocoalkyl and tallow-alkyl are the alkyls derived from coconut fatty acids and tallow fatty acids, respectively.

The dispersing and stabilizing agents of substance class B-2 are the compounds known from U.S. Pat. No. 3,945,996, which were obtained by reacting an alkane diamine of the Formula II:

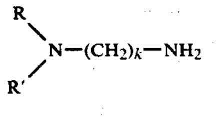

(II)

wherein R, R' and k have the above assigned values and which, therefore, is N-mono- or N-di-substituted by alkyl or alkenyl groups, with ε-caprolactam in a molar ratio of 1:1 to 1:5, particularly 1:1 to 1:3, and subsequent alkoxylation of this first reaction product with 0.5 to 3 mols of ethylene oxide, propylene oxide or glycide.

The substituted alkane diamines of Formula II which can be used as starting materials are, for example, the compounds N-dodecyl-1,2-ethane diamine, N-dodecyl-N-ethyl-1,3-propane diamine, N-decyl-1,3-propane diamine, N-decyl-1,4-butane diamine, N-tetradecyl-1,6-hexane diamine, N-cocoalkyl-1,3-propane diamine, N-tallow-alkyl-1,3-propane diamine, etc. Particularly suitable according to the invention as products of substance class B-2 are, for example, the reaction products of N-dodecyl-1,3-propane diamine+ε-caprolactam (1:2)+1 EO or 2 EO or 3 EO; N-cocoalkyl-1,3-propane diamine+ε-caprolactam (1:3)+1 EO; N-tallow-alkyl-1,3-propane diamine+ε-caprolactam (1:3)+1 EO, etc.

The hydroxyalkyl amines used as substance class B-3 are those of Formula III:

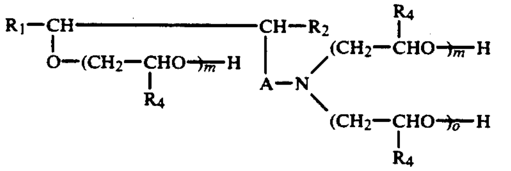

(III)

wherein $R_1$, $R_2$, $R_4$, A, m, n and o have the above-assigned values. These products were obtained in a single or two-stage reaction from terminal or non-terminal epoxy alkanes by reacting them at first with a mono- or diethanol amine, with a mono- or diisopropanol amine, with ammonia, with an alkylene diamine, with a polyalkylene polyamine, or with a hydroxyalkyl polyamine, and partly ethoxylating and/or propoxylating these addition products in the second stage. Preferred are ethoxylated products, that is, compounds of Formula III where $R_4$ denotes hydrogen.

The epoxy alkane used as a starting material is obtained in known manner from the corresponding olefins or olefin mixtures, respectively. The non-terminal epoxy alkanes are obtained, for example, by epoxidizing olefin mixtures which were obtained by catalytic dehydrogenation or by chlorination-dehydrochlorination of linear paraffins and selective extraction of the desired monoolefins. Monoolefins with non-terminal double bond can also be produced by isomerization of α-olefins.

The α- or 1,2-epoxy alkanes are produced from α-monoolefins which are obtained, for example, by polymerization of ethylene with organic aluminum compounds as catalysts, or by thermal cracking of paraffin wax. Preferred are monoolefins with chain lengths in the range $C_{12}$ to $C_{18}$ for the production of the hydroxyalkyl amines of Formula III.

Preferred non-terminal monoolefins of a $C_{11}$ to $C_{14}$ fraction and of a $C_{15}$ to $C_{18}$ fraction had the following chain length distribution:

| $C_{11}$ to $C_{14}$ Fraction |
|---|
| $C_{11}$-olefins about 22% by weight |
| $C_{12}$-olefins about 30% by weight |
| $C_{13}$-olefins about 26% by weight |
| $C_{14}$-olefins about 22% by weight |

-continued

| $C_{15}$ to $C_{18}$ Fraction |
|---|
| $C_{15}$-olefins about 26% by weight |
| $C_{16}$-olefins about 35% by weight |
| $C_{17}$-olefins about 32% by weight |
| $C_{18}$-olefins about 7% by weight |

The hydroxyalkyl amines of Formula III, which represent the derivatives of alkylene diamines, polyalkylene polyamines or hydroxyalkyl polyamines, are the reaction products of the terminal and non-terminal epoxyalkanes with ethylene diamine, propylene diamine, trimethylene diamine, tetramethylene diamine, pentamethylene diamine, hexamethylene diamine, or diethylene triamine or triethylene tetramine or hydroxyethyl- or hydroxyisopropylethylene diamine. These hydroxyalkyl amines are represented by Formula IIIa:

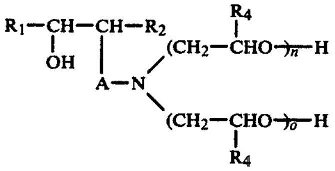

(IIIa)

wherein $R_1$, $R_2$, $R_4$, A, n and o have the above-assigned values.

These addition products can also be reacted in the second stage with a $C_2$ or $C_3$-alkylene oxide, preferably with ethylene oxide.

The hydroxyalkyl amines of Formula III, which derive from terminal epoxy alkanes ($R_2$=H), and where the symbol A stands for a simple C-N valence, are compounds which were obtained by reacting the terminal epoxy alkanes with mono- or diethanol amine or with mono- or diisopropanol amines, or with the corresponding longer chained polyhydroxyalkylene glycol amines and subsequent ethoxylation and/or propoxylation, if necessary. These hydroxyalkyl amines correspond thus to the Formula IIIb:

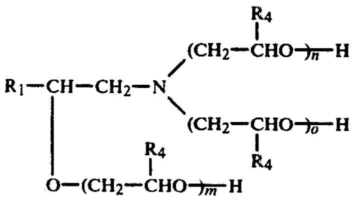

(IIIb)

wherein $R_1$ is alkyl having 6 to 16 carbon atoms, $R_4$ is H or $CH_3$, m is an integer from 0 to 3 and the sum of n+o is at least 1 with n and o having the above-assigned values.

In the corresponding derivatives of the non-terminal epoxy alkanes, Formula III comprises particularly the compounds obtained in a single stage reaction, if A denotes a simple valence, by the addition of the mono- or dialkanol amines, or the mono- or bis-hydroxyalkoxyalkyl amines, or the mono- or bis-hydroxyalkoxyalkoxyalkyl amines, derived from ethylene oxide or propylene oxide, or by the addition of ammonia. These adducts can be additionally ethoxylated or propoxylated. The resulting hydroxyalkyl amines thus correspond to Formula IIIc:

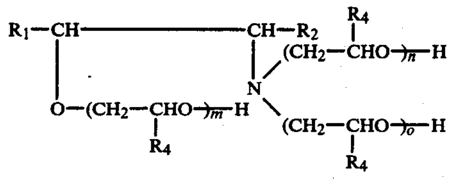
(IIIc)

wherein $R_1$ and $R_2$ are alkyl having from 1 to 16 carbon atoms and the sum of the carbon atoms in $R_1+R_2$ in the range of 6 to 20, preferably 8 to 18, $R_4$ denotes hydrogen or methyl, and where m, n and o have the numerical values 0 or 1 to 3, preferably m has the value 0, and the sum of n+o corresponds at least to the value 1, particularly to a value between 2 and 5.

The products of Formula IIIc, where m=0, are obtained either by reacting the epoxy alkane

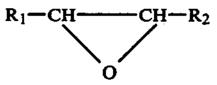

with the primary or secondary amine

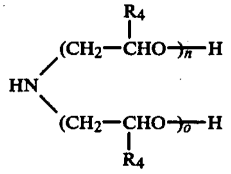

where the substituents and index numbers in these formulas have the same meaning as in Formula IIIc, or by ethoxylation or propoxylation of the adducts produced in the first stage from the epoxy alkanes with mono- or dialkanol amines under alkaline conditions, where the alkoxylation does not take place on the β-hydroxyl. Products with $R_4$=hydrogen are preferred.

The hydroxyalkyl amines of Formula III (or Formula IIIa, IIIb and IIIc) represent as a rule mixtures on the basis of their structure, and mode of formation. Thus the position of the vicinal substituents is distributed over the entire chain in the derivatives of non-terminal epoxy alkanes, which are mostly fractions of a certain chain length range. Furthermore, mixtures are formed in the reaction of the epoxy alkanes with the polyamines, because these polyamines can react with one of their primary or secondary amine groups. Finally the alkoxylation also leads necessarily to product mixtures.

According to the invention, hydroxyalkyl amines of Formula III whose turbidity point in water, determined according to DIN 53917, is below 50° C., are preferably used. Hydroxyalkyl amines of Formula III with this property are present if the sum of the carbon atoms of the alkyl groups $R_1$ and $R_2$ and the numerical values for the index numbers m, n and o as well as p to u in this formula are correspondingly selected. An increase of the sum of the carbon atoms in $R_1$ and $R_2$, that is, an increase in the length of the alkyl groups with given index numbers m to u leads to a reduction of the turbidity point, and higher numerical values for m to u, that is, an increase in the number of the propylene and particularly of the ethylene glycol ether groups leads to an increase of the turbidity point.

In difficulty soluble substances of Formula III, that is, those which have a turbidity point in water under 20° C. the measurements are made in aqueous butyl diglycol according to DIN 53917.

Dispersing agents of substance class B-3 which are suitable according to the invention are, for example, the reaction products from a nonterminal $C_{11}$ to $C_{14}$-epoxy alkane, with diethanol amine; a 1,2-epoxy-$C_{12}/C_{14}$-alkane with diethanol amine, or with monoethanol amine, a $C_{14}$ to $C_{16}$-1,2-epoxy alkane with diethanol amine, a $C_{12}$ to $C_{14}$-1,2-epoxy alkane with diethanol amine, the adducts of $C_{12}$-1,2-epoxy alkane with diethanol amine or $C_{16}$-1,2-epoxy alkane with diethanol amine adducted with 2 mols of ethylene oxide each; the reaction products from nonterminal $C_{11}$-$C_{14}$-epoxy alkane and diethanol amine, additionally ethoxylated with 1 mol of ethylene oxide or with 2 mols of ethylene oxide, or with 1 mol of propylene oxide, or with 2 mols of propylene oxide; the reaction product from nonterminal $C_{11}/C_{14}$-epoxy alkane and ethylene diamine and/or trimethylene diamine; the reaction product from $C_{12}/C_{14}$-1,2-epoxy alkane and hexamethylene diamine; the reaction product from nonterminal $C_{15}/C_{18}$-epoxy alkane and diethylenetriamine.

Suitable as dispersing agents of substance class B-4 according to the invention are diols which were obtained from terminal or nonterminal $C_8$ to $C_{22}$-epoxy alkanes by reacting them with ethylene glycol in a molar ratio of 1:1, whereby a diol with a primary and a second hydroxyl group is obtained, and this product was likewise ethoxylated. Preferred dispersing agents of substance class B-4 are the direct addition products of 1 mol of ethylene glycol onto 1 mol of $C_{15}$ to $C_{18}$-epoxy alkane, and the ethoxylates with 1 to 3 mols of ethylene oxide derived therefrom, for example, the products obtained from a 1,2-epoxy-$C_{15}$ to $C_{18}$ alkane with ethylene glycol and 1, 2 or 3 mols of ethylene oxide, the product obtained from a nonterminal $C_{11}$ to $C_{14}$-epoxy alkane with the chain length distribution indicated above in the description of substance class B-3 with ethylene glycol and 1 mol of ethylene oxide, or the product obtained from a nonterminal $C_{15}$ to $C_{18}$-epoxy alkane of the likewise indicated chain length distribution by reaction with ethylene glycol and 3 mols of ethylene oxide.

The aqueous suspensions according to the invention contain at least 20% of the water-insoluble aluminosilicates as component A, while the upper limit of the content of A is set by the limit of the fluidity. For aluminosilicates which consist practically completely of particles <5μ, this upper limit is at about 55%; for an aluminosilicate with particle sizes in the range of 9 to 10μ, this upper limit is about 40%. Concentrations between 25% and 40%, particularly between 28% and 38%, are preferred. In practice the range of 30% to 38% is most important.

The amount of component B to be used depends substantially on the desired degree of stabilization of the suspensions. In general, the concentration of component B in the suspensions according to the invention is about 0.2% to 5%, related to the total weight of the aqueous suspension. It is preferably in the range of about 0.3% to 4% by weight. Since the viscosity of the suspensions is influenced by the content of component B, the desired viscosity can be taken into consideration, if necessary, in the selection of the concentration of component B.

With finely divided aluminosilicates, smaller amounts of components B are necessary for stabilization than with coarsely divided products. Thus, for example, aluminosilicate suspensions, where 90% of the particles have a particle size between 1 and 8μ, can be as well stabilized by a content of the dispersing agent of 0.3% to 1% by weight, as products with a mean particle size of 10 to 12μ by a content of the dispersing agent of 1% to 2%. These data are merely approximate values. The suitable amount of component B to be used must be determined in each case according to the specific requirements.

The viscosity of the suspensions at 25° C. is generally between 500 and 30,000, preferably above 1,000, but below 15,000 cPs. Particularly suitable are the suspensions with viscosities between 1,000 and 9,000 cPs. Organic salts or hydroxide as derived from the precipitation or other production methods of the aluminosilicate are also present in addition to the mentioned components. That is, small amounts of excess sodium hydroxide, or sodium carbonate or bicarbonate formed from it by absorption of carbon dioxide may be present, or the sulfate ion, if aluminum sulfate was used as the aluminum-containing starting material for the preparation of aluminosilicate.

Basically, the aqueous suspensions also may contain additional substances in relatively small amounts besides the mentioned components A and B and, if necessary, substances remaining from the starting materials for the preparation of these components. Where the suspensions for washing agents and detergents are to be processed further, the additionally present substances are preferably substances suitable as components of washing and cleansing agent compositions.

An indication of the stability of the suspensions is provided by a simple test, in which an aluminosilicate suspension is prepared of the desired concentration, such as 31%, and containing a dispersing agent according to the invention as well as optionally other substances, and/or detergent components such as pentasodium tripolyphosphate, in varying amounts. The influence of the added substances can be observed visually by the precipitation characteristics of the suspension. A preferred suspension generally should not have settled beyond the point where the clear supernatant liquid, the solution free from silicate particles, amounts to more than 20%, preferably more than 10%, especially more than 6%, of the total height, after standing for 24 hours. In general, the amount of additives should be adjusted so that the suspension can be readily transferred again by pumping after standing for 12 hours, preferably 24 hours, and especially also after 48 hours of standing in the storage tank and pipes or tubes.

The settling characteristics of the suspensions containing further components, if desired, is tested at room temperature, at an overall height of 10 cm for the suspension. If the height of the clear supernatant liquid of especially preferred suspensions stays within the given range, even after four and especially after eight days, they can be pumped without any problem after four and after eight days. These data concerning the stability of the suspension again are guidelines. The desirable stability for the suspension must be determined for each individual case. When using the suspensions according to the invention as stock suspensions for extended storage in a tank, from which it can be removed by pumping, it may be advantageous to keep the portion of other components of washing and cleansing agent compositions, low or to eliminate them completely.

The suspensions can be prepared by the simple mixing of their components, in which process the aluminosilicates may be used, as is or moist, optionally from their preparation, or in aqueous suspension. Especially advantageous is the addition of aluminosilicates that are still moist, as filter cakes, to a dispersion of component B in water. This dispersion of component B is preferably warmed, to 50° C. to 70° C.

Dried aluminosilicates, for example, substances from which the adhering water has been removed, but that contain bound water, can also be used in the preparation of stable suspensions.

In an especially suitable process for the preparation of the suspensions according to the invention, aluminosilicate is precipitated by mixing sodium aluminate and sodium silicate solutions. These solutions are more alkaline, thus containing more theoretical sodium hydroxide than is necessary for the formation of the final aluminosilicate, so that an excess of sodium hydroxide is present in the aluminosilicate suspension, the immediate product of precipitation. This suspension is concentrated by filtering off part of the supernatant mother liquor, and subsequently freed from a sufficient amount of the excess sodium hydroxide present by rinsing with water, so that the sodium hydroxide content of the suspension is below about 5%, preferably below 3% or even below 2% by weight. The remaining sodium hydroxide is neutralized by the addition of an acid, particularly aqueous sulfuric acid, to such a degree that the obtained suspension has a pH between about 7 and 12, particularly between about 8.5 and 11.5. The amount of dispersing agent necessary to achieve the desired degree of stabilization is added to the suspension. This addition may be made before, during or after the partial neutralization step.

The suspensions according to the invention are characterized by high stability and other advantages. Their stabilizing effect is particularly valuable for aluminosilicates with a particle size of 5 to 30μ. They can be pumped, permitting the easy handling of moist aluminosilicates. The suspensions can be moved without any problem by pumping, even after longer interruptions in the pumping process. Due to their high stability, the suspensions can be transported in regular tank trucks and drum trucks without formation of useless or interfering residues. The suspensions are, therefore, exceptionally suitable as a form in which aluminosilicates can be delivered to detergent manufacturers, for example.

The suspensions can be stored at room temperature or higher temperatures, and transported through pipelines, pumps or other means. The suspensions are usually handled between room temperature, most preferably and about 60° C.

Particularly suitable are the suspensions according to the invention for the processing of flowing or tricklable products with a dry appearance, and for the preparation of powdery water softeners, through spray-drying. Thus, the suspensions have considerable value for the preparation of powdery aluminosilicates. No troublesome residues are found during the feeding of the aqueous suspension into the drying equipment. It was also observed that the suspensions of the invention can be processed into extremely dust-free products.

Because of their special stability, the suspensions according to the invention can be used as they are, without further compounding and with or without further additives possessing a cleansing, bleaching and/or washing effect, for example, as water softeners, washing or cleansing agents and particularly as liquid scouring products with increased suspension stability.

An especially important use of the suspensions is in the further conversion into pourable or tricklable washing and cleaning agents containing other compounds in addition to the components of the suspension.

The suspensions according to the invention are especially suitable for the preparation of washing and cleansing agent compositions described in U.S. patent application Ser. No. 458, 306, filed Apr. 5, 1974, now abandoned; Ser. No. 458,333, filed Apr. 5, 1975, now U.S. Pat. No. 4,071,377, and Ser. No. 458,326, filed Apr. 5, 1974, now abandoned, and all data for their preparation, their composition components and for the proportions of the components are applicable correspondingly.

Thus, the invention also concerns a process for the preparation of pourable powdery products with a content of water-insoluble aluminosilicates, as defined above, in which a pourable product is produced in the usual manner by starting with an aqueous, flowing solution of a premix of individual components of the products. The process is characterized by the fact that the aluminosilicates are used in the form of the suspensions according to the invention. The suspensions according to the invention can be converted into the solid, pourable washing and cleansing agent compositions by well-known processes.

Powdered, tricklable washing and cleansing agent compositions according to the invention are prepared in such a manner that a suspension according to the invention, from a storage tank, is mixed with at least one washing, bleaching or cleaning component of the product to be prepared, and that the mixture is subsequently converted into a powdered product by a customary process. A sequestering agent, a compound capable of binding the alkaline earth metal ions that make the water hard, particularly the magnesium and calcium ions, is added to advantage.

In general, the suspension according to the invention is combined preferably with at least one water-soluble surface-active compound or tenside for the preparation of washing and cleansing agent compositions according to the invention, which is not one of the possible substances of component B.

There are several variations of the preparation of washing and cleansing agent compositions. For example, the suspensions according to the invention can be combined with substances capable of adding water of crystallization, preferably by spraying the suspension onto the anhydrous or partially anhydrous compounds capable of adding water of crystallization, placed in a mixer, so that with constant mixing, a solid, seemingly dry product, is obtained. Tricklable, solid products are produced continuously by adding the suspension of the invention and granular water-binding substances simultaneously to a stationary mixer with vertical stirring and mixing means. Preferably, the suspensions according to the invention are subjected as a slurry, mixed with at least one additional washing, bleaching or cleaning agent, to spray-drying. Here an additional surprising advantage of the aluminosilicate suspensions was found. It was found that largely dust-free products can be obtained in spray-drying through the use of suspensions according to the invention. The products obtained by spray-drying have a high calcium-binding power and are readily wettable.

Washing agent compositions according to the invention, that is, washing agent compositions that can be prepared with the use of the suspensions described above, may have various compositions. Generally, they contain at least one water-soluble tenside that does not belong to the dispersing agents used according to the invention and present in the claimed aluminosilicate suspensions. The washing and cleansing agent compositions of the invention can be in general agreement with the overall formulations of the above-mentioned, prior patent applications. They contain an aluminosilicate, defined as above, as a calcium-binding compound, in addition to at least one other inorganic or organic compound that has a washing, bleaching or cleansing effect. Furthermore, such products may contain other conventional additives and adjuncts found mainly in smaller quantities. The above-mentioned, prior patent applications should be consulted for further details. The data also apply to these cases.

The content of aluminosilicates for such products may be from 5% to 95%, preferably from 15% to 60% by weight.

The compositions according to the invention may also contain sequestering or precipitating agents, for calcium, preferably with contents of 2% to 15% by weight, depending on the chemical nature of the agents.

The substantially phosphorus-free washing agent compositions should have a content of inorganic phosphates and/or organic phosphorus compounds not exceeding a total content of 6% P, preferably 3% P.

The additional components with a washing, bleaching or cleansing effect contained in the washing and cleansing agent compositions are surface-active compounds, surface-active or non-surface-active foam stabilizers or inhibitors, textile softeners, neutral or alkaline builders, chemically active bleaches as well as stabilizers and/or activators, that are different from component B. Other additives and adjuncts are usually present in smaller amounts, such as corrosion inhibitors, antimicrobial agents, soil suspension agents, enzymes, optical brighteners, dyes and perfumes.

The composition of typical washing agent compositions to be used at temperatures between 50° C. and 100° C. is in the range of the following formulation.

The composition of typical detergent powders produced with the suspensions according to the invention by spray-drying is within the range of the following formula:

8% to 25% of a surfactant component consisting of 1 part by weight non-ionic surface-active compound of the type of ($C_8$ to $C_{20}$)-alkyl/alkenyl-polyoxyethylene-glycol monoether, and 0 to 6 parts by weight of amphoteric and/or sulfonate and/or sulfate surface-active compounds, preferably 1 part by weight of the non-ionic tenside, and 0.1 to 4 parts by weight of the sulfonate and/or sulfate tensides, 0.5% to 3% of at least one dispersing agent B-1 to B-4 according to the above definition, 10% to 35%, preferably 12% to 30%, of the water-insoluble aluminosilicate A according to the above definition, particularly of a crystalline sodium aluminosilicate with a calcium-binding power of 100 to 200 mg CaO/gm, 0 to 35%, preferably 5% to 30%, of a water-soluble inorganic and/or organic sequestering agent capable of sequestering calcium-ions, 5% to 50% of non-sequestering builder salts, particularly wash-alkalis and/or sodium sulfate, and other auxiliary substances added in small amounts.

Additional washing or cleaning agent components which can be used are particularly the conventional non-surface-active foam inhibitors which do not belong to the substance classes B, either alone or in combination with foam reducing soaps, where preferably 0.2% to 1.5% of a non-surface-active foam inhibitor or 2% to 8% of a soap or a mixture of the non-surface-active foam inhibitor and of the soap is added in amounts of 0.2% to 8%. This addition is incorporated with advantage into the finished powder during the production of the powder preparations by hot spray-drying. If the suspensions according to the invention, and thus the premixes prepared with them are processed according to a cold mixing method, incorporation in this aqueous premix is also possible.

In the case of oxygen-supplying percompounds, particularly sodium perborate, which are preferably added as components of bleaching, washing- and cleaning agents, these are generally added to the spray-dried powder detergent, mixing 1 part by weight of this detergent powder with 0.2 to 0.4 parts by weight of the granular bleaching agent. These powdered detergents produced particularly with the suspensions according to the invention containing components A and B, yield again particularly stable suspensions when used with the water of the cleaning liquors during the entire application, for example, in washing textiles in the washing machine, they remain uniformly suspended and do not lead to deposits on the washed material.

Surprisingly the presence of the suspension-stabilizing compounds of the above-defined component B in these compositions leads to a synergistic increase of the washing power.

Such compositions of washing and cleaning agents supplying bleaching stable aqueous suspensions are preferably within the following formula:

5% to 20%, preferably 8% to 15%, of the above-defined tenside component,

6% to 30%, preferably 10% to 25%, of a water-insoluble crystalline sodium aluminosilicate according to the above-defined components with a calcium-binding power of 100 to 200 mg CaO/gm, 0.2% to 2.5% of at least one of the dispersing agents B-1 to B-4 according to the above definition, 0.2% to 30%, preferably 4% to 20%, of a water-soluble inorganic and/or organic sequestering agent capable of sequestering calcium-ions, 0 to 8%, preferably 0.15% to 6%, of a foam-reducing additive of a non-surface-active foam inhibitor or a soap, as defined above, 3% to 40% of wash alkalis and/or sodium sulfate, 0 to 35%, preferably 10% to 30%, of a bleaching component consisting of an active-oxygen-supplying peroxy compound, particularly sodium perborate, and if necessary, stabilizers and/or activators for this peroxy compound, 0.1% to 10% of other auxiliary substances for washing and cleaning agents from the group of soil suspension agents, textile, softeners, optical brighteners, enzymes, antimicrobials, dyes and perfumes.

We will now list the substances suitable for use in the detergents according to the invention.

The surface-active compounds or tensides contain in the molecule at least one hydrophobic organic moiety and one water-solubizing, anionic, non-ionic or amphoteric group. The hydrophobic moiety is mostly an aliphatic hydrocarbon radical with 8 to 26, preferably 10 to 22 and particularly 12 to 18, carbon atoms or an alkyl aromatic radical, such as alkylphenyl with 6 to 18, preferably 8 to 16, aliphatic carbon atoms.

Among the anionic surface-active compounds are, for example, soaps of natural or synthetic, preferably saturated fatty acids, optionally also, soaps of resinic or naphthenic acids. Suitable synthetic anionic tensides are those of the type of the sulfonates, sulfates and synthetic carboxylates.

The surfactants of the sulfonate type which can be used are the alkylbenzene sulfonates ($C_{9-15}$ alkyl), mixtures of alkene and hydroxyalkane sulfonates, as well as disulfonates, as they are obtained, for example, from monoolefins with terminal or nonterminal double bond by sulfonation with gaseous sulfur trioxide and subsequent alkaline or acid hydrolysis of the sulfonation products. Also suitable are alkane sulfonates which are obtained from alkanes by sulfochlorination or sulfoxidation and subsequent hydrolysis or neutralization or by the addition of a bisulfite onto olefins. Other suitable surfactants of the sulfonate type are the esters of $\alpha$-sulfo-fatty acids, e.g., the $\alpha$-sulfonic acids from hydrogenated methyl or ethyl esters of coconut, palm kernel, or tallow fatty acid.

Suitable surfactants of the sulfate type are the sulfuric acid monoesters of primary alcohols (e.g., from coconut fatty alcohols, tallow fatty alcohols, or oleyl alcohols, and those of secondary alcohols). Also suitable are sulfated fatty acid alkanol amides, fatty acid monoglycerides, or reaction products of 1 to 6 mols of ethylene oxide with primary or secondary fatty alcohols or alkylphenols.

The anionic tensides can be present in the form of their sodium, potassium, and ammonium salts, as well as soluble salts of organic bases, such as mono, di or triethanol amine.

Suitable non-ionic surface-active compounds of the type of the aliphatic polyoxyethylene glycol monoethers are particularly the addition products of 5 to 40, preferably 8 to 20, mols of ethylene oxide onto 1 mol of an aliphatic $C_8$ to $C_{20}$ alkanol or alkenol. These are the ethoxylation products of straight-chained primary alkanols and alkenols which can be both of synthetic and natural origin, and the ethoxylation products of the so-called oxoalcohols obtained by hydroformylation of olefins, and of the alkanols of the corresponding chain lengths obtained by paraffin oxidation. Of particular interest are the ethoxylation products of these $C_{10}$ to $C_{18}$ alcohols.

In addition to these, practically water-soluble non-ionics, the ethoxylation products with 2 to 6 oxyethylene units in the molecule, which are not or not completely water soluble, are also of interest if they are used together with the higher ethoxylated non-ionics, where a good cleaning effect is achieved particularly with regard to hydrophobic soil.

Typical representatives of the non-ionic surface-active compounds or tensides, for example, are the compounds:

decyl alcohol + 6 EO
lauryl alcohol + 8 E0
coconut fatty alcohol + 9 EO
$C_{12}/C_{14}$-synthetic fatty alcohol + 12 EO
oleyl/cetyl alcohol + 10 EO (iodine number of alcohol about 50)
tallow fatty alcohol + 7 EO
tallow fatty alcohol + 8 EO
tallow fatty alcohol + 11 EO
tallow fatty alcohol + 14 EO $C_{12}$–$C_{15}$-oxoalcohol+13 EO
$C_{12}$–$C_{14}$-oxoalcohol+8 EO
$C_{16}$–$C_{19}$ -oxoalcohol+10 EO
$C_{16}$–$C_{19}$-oxoalcohol+18 EO (about 25% α-methyl-branching of of the oxoalcohols)
sec. $C_{11}$–$C_{15}$-alkanol+9 EO
coconut fatty alcohol+3 EO
tallow fatty alcohol+5 EO
oleylcetyl alcohol+5 EO
lauryl alcohol+3 EO
$C_{12}$/$C_{14}$-synthetic fatty alcohol+4.5 EO
$C_{12}$/$C_{16}$-synthetic fatty alcohol+6 EO
$C_{12}$–$C_{15}$-oxoalcohol+3 EO
$C_{16}$–$C_{19}$-oxoalcohol+5 EO
sec. $C_{11}$–$C_{15}$-alkanol+3 EO (EO=ethylene oxide).

Also suitable as non-ionic tensides are the water-soluble addition products of ethylene oxide onto polyoxypropylene glycol, alkylene diamine polyoxypropylene glycol, and alkylpolyoxypropylene glycols with 1 to 10 carbon atoms in the alkyl chain, containing 20 to 250 oxyethylene units and 10 to 100 oxypropylene groups, in which the polyoxypropylene glycol chain acts as a hydrophobic radical.

Non-ionic surfactants of the type of the amine-oxides or sulfoxides can also be used, for example, the compounds:
N-cocoalkyl-N,N-dimethyl aminoxide
N-hexadecyl-N,N-bis-(2,3-dihydroxypropyl)-aminoxide
N-tallow alkyl-N,N-dihydroxylethyl aminoxide.

The term "non-ionic tensides" (non-ionics) thus does not comprise the suspension-stabilizing dispersing agents of the suspensions according to the invention.

The amphoteric or zwitterionic surface-active compounds (tensides) are preferably derivatives of aliphatic quaternary ammonium compounds where one of the aliphatic radicals consists of a $C_8$ to $C_{18}$ radical and another contains an anionic water-solubilizing carboxy group, sulfo group or sulfato group. Typical representatives of such surface-active betaines are the compounds:
3-(hexadecyl-N,N-dimethyl-ammonio)-propane sulfonate
3-(tallow alkyl-N,N-dimethyl-ammonio)-2-hydroxypropanesulfonate
3-(N-hexadecyl-N,N-bis-[2-hydroxyethyl]-ammonio)-2-hydroxypropyl-sulfate
3-(N-cocoalkyl-N,N-bis-[2,3-dihydroxypropyl]-ammonio)-propanesulfonate
N-tetradecyl-N,N-dimethyl-ammonio-methane carboxylate
N-hexadecyl-N,N-bis-(2,3-dihydroxy-propyl)-ammonio-methane carboxylate.

The builder salts are both compounds which are capable of sequestering calcium, and those which do not have this capacity. To the latter belong the so-called "wash alkalis", for example, the bicarbonates, carbonates, borates or silicates of the alkali metals. In addition, these compounds include the alkali metal sulfate, especially sodium sulfate, as well as the alkali metal salts of organic, non-capillary-active sulfonic acids, carboxylic acids and sulfocarboxylic acids, containing 1 to 8 carbon atoms. Examples are the water-soluble salts of benzene, sulfonic acid, toluene sulfonic acid or xylene sulfonic acid as well as the water-soluble salts of sulfoacetic acid, sulfobenzoic acid or of sulfodicarboxylic acids. The sequestering builder salts are primarily sodium tripolyphosphate and other alkali metal salts of condensed phosphates, as well as a great number of known organic sequestering agents of the type of the polycarboxylic acids, among which are also included here the polymeric carboxylic acids, of the type of the aminocarboxylic acids, the phosphonic acids, the phosphonocarboxylic acids, the hydroxycarboxylic acids, the carboxylethyl ethers, etc., preferably used in the form of the alkali metal salts.

Among the active oxygen carriers serving as bleaching agents, which supply $H_2O_2$ in water, sodium perborate tetrahydrate ($NaBO_2.H_2O_2.3H_2O$) and the monohydrate ($NaBO_2.H_2O_2$) are of particular importance. However, other $H_2O_2$-supplying borates can also be used, for example, perborax $Na_2B_4O_7.4H_2O_2$. These compounds can be replaced partly or completely by other active oxygen-carriers, particularly by peroxyhydrates, such as peroxycarbonates ($Na_2CO_3.1.5H_2O_2$), peroxypyrophosphates, citrate perhydrates, urea-$H_2O_2$ compounds or melamine$H_2O_2$ compounds as well as by $H_2O_2$-supplying peracid salts, such as caroates ($KHSO_5$), perbenzoates or peroxyphthalates.

It is advisable to incorporate conventional, mostly water-insoluble stabilizers for the peroxy compounds together with the latter in amounts of 1% to 8%, preferably 2% to 7% by weight. Particularly suitable in this respect are the magnesium silicates, $MgO:SiO_2=4:1$ to 1:4, preferably 2:1 to 1:2, and particularly 1:1, which are mostly obtained by precipitation from aqueous solutions.

In order to achieve a satisfactory bleaching effect when washing at temperatures below 80° C., particularly in the range 60° C. to 40° C., the preparations should contain bleaching component activators, such as the N-acyl compounds.

The non-surface-active foam inhibitors are generally water-insoluble compounds containing mostly aliphatic $C_8$ to $C_{22}$ carbon radicals. Preferred non-surface-active foam inhibitors for the preparations according to the invention are the N-alkylaminotriazines, that is, reaction products of 1 mol of cyanuric chloride with 2 to 3 mols of a mono- or dialkyl amine with substantially 8 to 18 carbon atoms in the alkyl. Also suitable are the propoxylated and/or butoxylated aminotriazines, for example, the reaction products of 1 mol of melamine with 5 to 10 mols of propylene oxide and an additional 10 to 50 mols of butylene oxide; as well as the aliphatic $C_{18}$ to $C_{40}$ alkanols, such as stearone, the fatty ketones from hardened train oilfatty acids and tallow fatty acids, etc. Also suitable are the paraffins and haloparaffins with melting points below 100° C. as well as polymeric silicon-organic compounds of the type of silicone oils.

The foam reducing effect of soaps rises with the degree of saturation and the carbon number of the fatty acid radical. Suitable as foam-inhibiting soaps are, therefore, soaps of natural or synthetic origin which have a high portion of $C_{18}$ to $C_{22}$ fatty acids, e.g., the derivatives of hydrogenated train oils and rape oils.

The products prepared according to the invention can be used for the various cleaning tasks in numerous technical areas and in the household. Examples of such areas of application are the cleaning of tools, vessels of wood, plastics, metal, earthenware, glass, etc. in the industry or in commercial establishments; the cleaning of furniture, walls, floors, objects of earthenware, glass, metal, wood, plastics, the cleaning of polished or shellacked surfaces in the household, etc. An especially important area of application is the washing of textiles of all types in the industry, in commercial cleaning establishments and in the household.

The following specific embodiments are illustrative of the invention without being limitative in any respect.

EXAMPLES

Preparation of Aluminosilicates

First, the synthesis of aluminosilicates used in the suspensions according to the invention is described for which no invention is claimed. The description is purely illustrative. Other well known processes for the preparation of aluminosilicates can be used as described in the above-mentioned patent applications.

($\alpha$) The sodium aluminate solution was reacted with the calculated amount of sodium silicate solution under vigorous agitation in a 15-liter vessel (temperature of the solutions 20° C. to 80° C.). A sodium aluminosilicate that was x-ray amorphous was produced as primary precipitation product in an exothermic reaction. After ten minutes of vigorous agitation the suspension of the precipitation product was either:

(1) processed further directly, i.e., without crystallization, or (2) heated at 80° C. for three to six hours for crystallization, or ageing, after which products were obtained completely crystalline according to x-ray.

($\beta$) The mother liquor was filtered off from the suspensions obtained above. The remaining filter cake was washed with deionized water and then mixed with deionized water to form the suspension $\beta 1$ (from ($\alpha$)1) or $\beta 2$ (from ($\alpha$)2).

($\gamma$) A microcrystalline aluminosilicate was prepared by reacting the aluminate solution, diluted with deionized water, with the silicate solution, with vigorous agitation with a high speed agitator (10,000 r.p.m., "Ultraturrax" made by Janke & Kunkel IRA-Werk, Staufen/Breisgau, Germany). After ten minutes of vigorous agitation, the suspension of the amorphous precipitation product was transferred to a crystallization vessel, where the formation of large crystals was prevented by agitating the suspension. After the removal of the liquor from the crystal mass by suction and washing with deionized water until the collected wash water had a pH of about 10, the filter residue was dried, then pulverized in a ball mill and separated into two fractions by a centrifugal sifter ("Microplex" air sifter by Alpine, Augsburg, Germany). The finer fraction did not contain any particles above 10μ. From the finer fraction, a suspension in deionized water ($\gamma 1$) was prepared. A corresponding suspension was also prepared without the drying process and the separation into two fractions. The moist filter cake of variable moisture content was added to water. The suspension obtained is called $\gamma 2$. The separation of the aluminosilicates from the larger portion of the originally present water was carried out by centrifuging instead of filtration in some cases.

The aluminosilicates obtained had the approximate composition calculated for anhydrous products (AS):

$$1Na_2O.Al_2O_3.2SiO_2$$

The calcium binding power of the precipitation products was 150 to 175 mg CaO/gm active substance. The calcium binding power was determined as follows.

One liter of an aqueous solution containing 0.594 gm $CaCl_2$ (300 mg CaO/l = 30° dH) and adjusted to pH 10 with dilute NaOH was reacted with 1 gm of the aluminosilicate (on the anhydrous basis, AS). Then the suspension was agitated vigorously for 15 minutes at a temperature of 22° C.+2° C. After filtering the aluminosilicate, the residual hardness x of the filtrate was determined. The calcium binding power was calculated from this in mg CaO/gm AS, using the formula: (30−x).10. For shorthand purposes this test procedure will be referred to as the Calcium Binding Power Test Method.

| Production Conditions for Aluminosilicate I: | |
|---|---|
| Precipitation: | 2.985 kg of an aluminate solution of the composition: 17.7% $Na_2O$, 15.8% $Al_2O_3$, 66.6% $H_2O$ |
| | 0.15 kg of sodium hydroxide |
| | 9.420 kg of water |
| | 2.445 kg of a 25.8% sodium silicate solution of the composition: 1 $Na_2O$ 6.0 $SiO_2$, prepared freshly from commercial waterglass and easily alkali soluble silica. |
| Crystallization: | 24 hours at 80° C. |
| Drying: | 24 hours at 100° C. |
| Composition: | 0.9 $Na_2O$ . 1 $Al_2O_3$ . 2.05 $SiO_2$ . 4.3 $H_2O$ (= 21.6% $H_2O$) |
| Degree of Crystallization: | Fully crystalline. |
| Calcium Binding Power: | 150 mg CaO/gm AS. |

If the product obtained was dried for one hour at 400° C., an aluminum silicate Ia was obtained of the composition:

$$0.9Na_2O.1Al_2O_3.2.04SiO_2.2.0H_2O\ (=11.4\%\ H_2O)$$

which is likewise suitable for the purposes of the invention.

| Production Conditions for Aluminosilicate II: | |
|---|---|
| Precipitation: | 2.115 kg of an aluminate solution of the composition: 17.7% $Na_2O$, 15.8% $Al_2O_3$, 66.5% $H_2O$ |
| | 0.585 kg of sodium hydroxide |
| | 9.615 kg of water |
| | 2.685 kg of a 25.8% sodium silicate solution of the composition: 1 $Na_2O$. 6.0 $SiO_2$ (prepared as under I). |
| Crystallization: | 24 hours at 80° C. |
| Drying: | 24 hours at 100° C. and 20 torr. |
| Composition: | 0.8 $Na_2O$ . 1 $Al_2O_3$ . 2.655 $SiO_2$ . 5.2 $H_2O$ |
| Degree of Crystallization: | Fully crystalline. |
| Calcium Binding Power: | 120 mg CaO/gm AS. |

This product too can be dehydrated by drying (for one hour at 400° C.) to the composition:

$$0.8Na_2O.1Al_2O_3.2.65\ SiO_2.0.2H_2O$$

This dehydration product IIa is likewise suitable for the purposes of the invention.

The aluminosilicates I and II show in the x-ray diffraction diagram the following interference lines.

| d-values, recorded with Cu-$K_\alpha$-radiation in Å | |
|---|---|
| I | II |
| — | 14.4 |
| 12.4 | — |
| — | 8.8 |
| 8.6 | — |
| 7.0 | — |

-continued

| I | II |
|---|---|
| — | 4.4 (+) |
| 4.1 (+) | — |
| — | 3.8 (+) |
| 3.68 (+) | — |
| 3.38 (+) | — |
| 3.26 (+) | — |
| 2.96 (+) | — |
| — | 2.88 (+) |
| — | 2.79 (+) |
| 2.73 (+) | — |
| — | 2.66 (+) |
| 2.60 (+) | — |

It is quite possible that not all these interference lines will appear in the x-ray diffraction diagram, particularly if the aluminosilicates are not fully crystallized. For this reason, the d-values which are the most important for the characterization of these types are identified by a "(+)".

| Production Conditions for Aluminosilicate VIII: | |
|---|---|
| Precipitation: | 2.115 kg of an aluminate solution of the composition: 17.7% $Na_2O$, 15.8% $Al_2O_3$, 66.5% $H_2O$<br>0.585 kg of sodium hydroxide<br>9.615 kg of water<br>2.685 kg of a 25.8% sodium silicate solution of the composition: 1 $Na_2O$ . 6 $SiO_2$ (prepared as in I). |
| Crystallization: | Not carried out. |
| Drying: | 24 hours at 100° C. |
| Composition: | 0.8 $Na_2O$ . 1 $Al_2O_3$ . 2.65 $SiO_2$ . 4 $H_2O$ |
| Degree of Crystallization: | X-ray amorphous. |
| Calcium Binding Power. | 60 mg CaO/gm AS. |

| Production Conditions for Aluminosilicate IX: | |
|---|---|
| Precipitation: | 3.41 kg of an aluminate solution of the composition: 21.4% $Na_2O$, 15.4% $Al_2O_3$, 63.2% $H_2O$<br>10.46 kg of water<br>1.13 kg of a 34.9% sodium silicate solution of the composition: 1 $Na_2O$ . 3.46 $SiO_2$. |
| Crystallization: | Not carried out. |
| Drying: | 24 hours at 100° C. |
| Composition: | 1 $Na_2O$ . 1 $Al_2O_3$ . 1 $SiO_2$ . 1.4 $H_2O$. |
| Degree of Crystallization: | X-ray amorphous. |
| Calcium Binding Power: | 120 mg CaO/gm AS. |

| Production Conditions for aluminosilicate XXm: | |
|---|---|
| Precipitation: | 0.76 kg of an aluminate preparation of the composition: 36.0% $Na_2O$, 59.0% $Al_2O_3$, 5.0% $H_20$<br>0.95 kg of sodiuim hydroxide<br>9.49 kg of water<br>3.94 kg of a commercial sodium silicate solution of the composition: 8.0% $Na_20$, 26.9% $SiO_2$, 65.1% $H_2O$. |
| Crystallization: | 12 hours at 90° C. |
| Drying: | 12 hours at 100° C. |
| Composition: | 0.9 $Na_2O$ . 1 $Al_2O_3$ . 3.1 $SiO_2$ . 5 $H_2O$ |
| Degree of Crystallization: | Completely crystalline. |
| Calcium Binding Power: | 110 mg CaO/gm AS. |

ABS—the salt of an alkyl benzene sulfonic acid with 10 to 15, substantially 11 to 13, carbon atoms in the alkyl chain, obtained by condensation of straight-chained olefins with benzene, and sulfonation of the alkylbenzene thus obtained.

Olefin Sulfonate—a mixture of hydroxyalkane sulfonate, alkene sulfonate and alkane disulfonate obtained by sulfonation of α-olefins with 12 to 18 carbon atoms with $SO_3$ and hydrolysis of the sulfonation product with sodium hydroxide solution.

Fs-Ester Sulfonate—a sulfonate obtained from hydrated palm kernel fatty acid-methyl ester after sulfonation with $SO_3$.

Alkane Sulfonate—a sulfonate obtained by the sulfoxidation of $C_{12-18}$ paraffins.

Soap—a soap produced from a hardened mixture of equal parts by weight of tallow and rape oil fatty acids (iodine number = 1).

OA+x EO or TA+x EO or CA+x EO—the addition products of x mols of ethylene oxide (EO) onto 1 mol of technical oleyl alcohol (OA) (iodine number 50), or on tallow fatty alcohol (TA) (iodine number = 0.5), or on coconut fatty alcohol (CA) (iodine number = <0.5).

Foam Inhibitor—Silicone oil "SAG 100"R by Union Carbide

Perborate—a technical product of the approximate composition: $NaBO_2.H_2O_2.3H_2O$ EDTA—the salt of ethylenediaminetetraacetic acid.

HEDP—the salt of 1-hydroxyethane-1,1-diphosphonic acid.

CMC—the salt of carboxymethyl cellulose.

PHAS—the salt of a poly-α-hydroxyacrylic acid, molecular weight: 35,000 to 40,000.

Waterglass—a sodium silicate of the composition: $Na_2O$ $.3.35SiO_2$

Bleach Activator—the compound tetraacetylglycoluril.

All salt compounds are used as the sodium salt.

SUSPENSIONS ACCORDING TO THE INVENTION

EXAMPLE 1

The suspensions according to the invention are illustrated with the microcrystalline aluminosilicates prepared according to γ2, since these are preferred for the preparation of washing and cleansing agent compositions. The suspensions according to the invention can also correspondingly be prepared from the suspensions of β1, β2 and γ1 or from corresponding luminosilicates isolated as solids.

155 to 195 gm of moist aluminosilicates (γ2 process) were employed. The amount of moist aluminoilicate used was adjusted to the moisture content so that the same amount on an anhydrous basis (AS) was added. The moist aluminosilicates were added to a mixture of so many parts of water and dispersing agent that the mixtures obtained had a content of as active substance (AS) of aluminosilicate in the range of 30% to 38% by weight. The amount of the added dispersing agent was 1.0% to 3% by weight. The process was carried out at room temperature. weight. The process was carried out at room temperature.

The following compounds were used as dispersing agents: some suspensions and the components from which they were formed are listed in the following Table I.

The following abbreviations and their analogs are used for the identification of the dispersing agents:

| | |
|---|---|
| i-11-14 | nonterminal $C_{11}$—$C_{14}$ epoxyalkane |
| α-12-14 | terminal $C_{12}$—$C_{14}$ epoxyalkane |
| α-12 | 1,2-epoxydodecane |
| EDA | ethylene diamine |
| HMDA | hexamethylene diamine |
| PDA-1,2 | 1,2-propylene diamine |
| PDA-1,3 | 1,3-propylene diamine |
| DETA | diethylene triamine |
| DEA | diethanol amine |
| EO | ethylene oxide |
| PO | propylene oxide |
| DOPDA ½ | reaction product of 1 mol N-dodecyl-1,3-propylene diamine and 2 mols ε-caprolactam |
| EG | ethylene glycol |
| Coco-PDA-1,3 | N-cocoalkyl-1,3-propylene diamine |

| | |
|---|---|
| (1) i-11-14 + EDA | 13) α-12 + DEA |
| (2) α-12-14 + HMDA | 14) α-12-+ DEA + 2 EO |
| (3) i-11-14 + PDA-1,3 | 15) DOPDA ½ + 1 EO |
| (4) i-11-14 + PDA-1,2 | 16) DOPDA ½ + 3 EO |
| (5) i-15-18 + DETA | 17) α-15-18 + EG |
| (4) 1 EO | |
| (6) α-15-18 + PDA-1,2 | 18) α-15-18 + EG + 2 EO |
| (7) i-15-18 + PDA-1,3 | 19) α-15-18 + EG + 3 EO |
| (8) i-15-18 + HMDA | 20) α-12-14 + EG |
| (9) i-11-14 + DEA | 21) Coco-PDA-1,3 + 2 PO |
| (10) α-14-16 + DEA | 22) α-12 + PDA-1,3 + 2.4 EO |
| (11) i-11-14 + DEA + 1 EO | |
| (12) 1-11-14 + DEA + 2 PO | |

Of the substances of component B, the following compounds were used in the three different concentrations:

α-12-14+HMDA

α-12+PDA-1,3+2.4 EO i-15-18+PDA-1,3

The homogeneous suspensions were circulated under continued stirring by means of a hose pump (Trademark IKA P 20) for one hour at room temperature. Then the circulation and the stirring were stopped for one hour. Subsequently the circulation and the stirring were continued. In a comparison test without the dispersing agent, the suspension could no longer be stirred and recirculated. After additional pumping and stirring for four to six hours, the suspensions were left standing overnight and the settling behavior was checked visually at room temperature. The settling rate in the suspensions according to the invention was 2% to 12%, while in the suspensions without the dispersing agent over 50% had already settled after one hour and could no longer be circulated, as indicated above. Following the determination of the settling behavior, the suspensions were again checked for their pumpability. The above-listed substances all proved suitable as dispersing agents, since the suspensions prepared with them could be easily stirred and circulated.

TABLE 1

| 1 | 2 | 3 | 4 | 5 | 6 | 7 |
|---|---|---|---|---|---|---|
| Component A (% by weight) | Moist Amount (gm) | Component A in Suspension (gm) | (% by weight) | Water Addition (gm) | Component B | (gm) |
| 50 | 600 | 300 | 30 | 370 | i-11-+ EDA | 30 |
| 50 | 650 | 331 | 33 | 340 | α-12-14 + HMDA | 10 |
| 39.8 | 700 | 278 | 30 | 200 | i-11-14 + PDA-1,3 | 20 |
| 39.8 | 780 | 310 | 31 | 190 | i-11-14 + DEA + 1 EO | 30 |
| 39.8 | 780 | 310 | 31 | 190 | DOPDA ½ 30 1 EO | 30 |

In Table 1 are indicated:
Column 1 - "Component A" the active substance content of themoist aluminosilicate used.
Column 2 - The amount of moist aluminosilicates used for the production of the suspension.
Columns 3 and 4 - "Component A in Suspension" the active substance content of the suspension in grams and % by weight, respectively.
Column 5 - The amount of water added to the moist aluminosilicate.
Columns 6 and 7 - The dispersing agent used and its amount in grams.

All suspensions are highly stable and could still be pumped satisfactorily from a reservoir after periods of one day and more by means of an ordinary hose pump (Trademark IKA P 20, IKA-Werk Stauffen/Breisgau, Germany).

EXAMPLE 2

Pumping and Storage Tests with Aluminosilicate Suspensions

For the preparation of the suspensions, the respective dispersing agent was emulsified in the water heated to 65° C. to 70° C. and moist sodium aluminosilicate with different water contents was introduced and homogenized in such amounts that the AS-content was 31%. The amount of dispersing agent was adjusted to 1%, 2% and 3%. The water-insoluble aluminosilicate (component A) was an aluminosilicate of the approximate composition:

$$Na_2O.Al_2O_2.2SiO_2$$

produced according to γ2, which was still moist from the production. The particle size was predominantly between 5 and 10μ.

EXAMPLE 3

Suspensions according to the invention were prepared by introducing the aluminosilicates I, II, VIII, IX and XXm, respectively, into a dispersion of the active substances of component B in water preheated to 60° C. to 70° C. to give a silicate suspension with 33% AS content and 2% content of the dispersing agents of Example 2.

The suspensions were cooled to room temperature and observed at this temperature. We thus worked at room temperature. The suspensions were highly stable.

EXAMPLE 4

Powdered, tricklable washing agents of the composition indicated in Table 2 were produced as follows:

A stock suspension which had been prepared by introducing a moist aluminosilicate produced according to γ2 into a dispersion of the dispersing agent heated to 70° C., and which had a content of 36% by weight of aluminosilicate and 2% by weight of the dispersing agent B, based on the total weight of the suspension, was pumped from a storage tank into a vessel into which the other heat and hydrolysis resistant components and so much water were introduced successively under stirring that a detergent batch (slurry) containing about 45% by weight of water was formed. This slurry was pumped through the spray nozzles arranged at the upper end of a spray tower and converted into a fine powder by atomizing the slurry into a stream of hot air (about 260° C.) in counterflow. The components not suitable for spray-drying, such as sodium perborate, were subsequently added to the powder.

Of the examples of Table 2, the detergents of Formula 4a, 4b, 4d, 4f, 4h and 4i represent high temperature detergents, and the detergents of Formula 4c, 4d and 4g represent detergents active at 60° C.

TABLE 2

| Components | Detergent Components in % For Example | | | | |
|---|---|---|---|---|---|
| | 4a | 4b | 4c | 4d | 4e |
| ABS | 6.0 | — | — | — | 3.0 |
| TA + 14 EO | 1.5 | 1.5 | 1.5 | 1.5 | 1.0 |
| TA + 5 EO | 1.5 | 1.5 | 1.5 | 1.5 | — |
| Fs-ester sulfonate | — | — | 3.0 | — | — |
| Alkane sulfonate | — | — | — | 6.0 | — |
| Olefin sulfonate | — | 6.0 | 3.0 | — | — |
| Tallow alcohol + 3 EO + sulfate | — | — | — | — | 4.0 |
| Soap | 3.0 | 3.5 | 3.5 | 3.0 | 3.5 |
| Foam inhibitor | — | — | — | — | — |
| α-12 + PDA-1,3 + 2.4 EO | 1.0 | — | — | — | — |
| DOPDA ½ + 1 EO | — | 1.0 | — | — | — |
| i-11-14 + DEA | — | — | 1.0 | — | — |
| i-11-14 + DEA + 1 EO | — | — | — | — | — |
| α-12-14 + HMDA | — | — | — | 1.0 | — |
| α-15-18 + EG + 1 EO | — | — | — | — | 1.0 |
| PHAS | — | — | — | — | 20.0 |
| $Na_5P_3O_{10}$ | 20.0 | — | 20.0 | — | — |
| NTA | — | 20.0 | — | — | — |
| Aluminosilicate y2 | 20.0 | 20.0 | 20.0 | 20.0 | 20.0 |
| HEDP | — | — | — | — | — |
| EDTA | 0.2 | 0.2 | 0.2 | 0.2 | 0.2 |
| Perborate | 25.0 | 25.0 | 25.0 | 25.0 | 15.0 |
| Bleach activator | — | — | 15.0 | — | 15.0 |
| Waterglass | 3.0 | 3.0 | 3.0 | 12.0 | 3.0 |
| Sodium carbonate | — | — | — | 6.0 | — |
| Mg-silicate | 2.0 | 2.0 | 2.0 | 2.0 | 2.0 |
| CMC | 1.5 | 1.5 | 1.5 | 1.5 | 1.5 |

| Components | Detergent Components in % for Example | | | |
|---|---|---|---|---|
| | 4f | 4g | 4h | 4i |
| ABS | — | 6.0 | — | — |
| TA + 14 EO | 6.0 | 1.5 | 3.5 | 3.0 |
| TA + 5 EO | 4.0 | 1.5 | 6.0 | 3.0 |
| Fs-ester sulfonate | — | — | — | — |
| Alkane sulfonate | — | — | — | — |
| Olefin sulfonate | — | — | — | — |
| Tallow alcohol + 3 EO + sulfate | — | — | — | — |
| Soap | 1.5 | 3.0 | 1.5 | 1.5 |
| Suds-inhibitor | 0.3 | — | — | — |
| α-12+PDA-1,3 + 2.4 EO | 1.0 | — | — | — |
| DOPDA ½ + 1 EO | — | — | — | — |
| i-11-14 + DEA | — | — | — | — |
| i-11-14 + DEA + 1 EO | — | — | 2.0 | 2.0 |
| α-12-14 + HMDA | — | 1.0 | — | — |
| α-15-18 + EG + 1 EO | — | — | — | — |
| PHAS | — | — | — | — |
| $Na_3P_3O_{10}$ | — | 20.0 | 20.0 | 20.0 |
| NTA | — | — | — | — |
| Aluminosilicate y2 | 20.0 | 20.0 | 20.0 | 20.0 |
| HEDP | 10.0 | — | — | — |
| EDTA | 0.2 | 0.2 | 0.2 | 0.2 |
| Perborate | 25.0 | 15.0 | 25.0 | 25.0 |
| Bleach activator | 0 | 15.0 | — | — |
| Waterglass | — | — | — | — |
| Soda | — | — | — | — |
| Mg-silicate | 2.0 | 2.0 | 2.0 | 2.0 |
| CMC | 1.5 | 1.5 | 1.4 | 1.2 |

Balance: sodium sulfate, water, enzymes, optical brightner, perfume

EXAMPLE 5

Aluminosilicate suspensions with 37% AS content and a content of the dispersing agents indicated were produced according to Example 4. The stabilized suspensions are suitable among others for the production of aqueous batches (slurries) of detergent components, which are then spray-dried. They can also be processed directly to pellets by mixing with calcined salts (e.g., pentasodium triphosphate, sodium sulfate, sodium carbonate in a ratio of 1:1:1).

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. Stable, pumpable aqueous suspensions having a pH of between 7 and 12 of water-insoluble, calcium-binding aluminosilicates suitable as stock suspensions consisting essentially of:

(A) from 20% to 55% by weight on the anhydrous basis of at least one finely-divided, water-insoluble silicate compound having an average particle size in the range of from 0.01μ to 100μ and a calcium-binding power of from 50 to 200 mg CaO/gm of anhydrous substance when measured at 22° C. by the Calcium Binding Power Test Method described in the specification and having the formula, combined water not shown $$(M_2O)_x.Me_2O_3.(SiO_2)_y$$

wherein M is a cation selected from the group consisting of sodium, potassium and lithium, x is a number from 0.7 to 1.5, Me is a member selected from the group consisting of aluminum and boron, and y is a number from 0.8 to 6, (B) from 0.2% to 5% by weight of at least one organic dispersing agent selected from the group consisting of:

(1) the adduct of an oxide selected from the group consisting of 1 to 3 mols of ethylene oxide, 1 to 3 mols of propylene oxide and 0.5 to 3 mols of glycide onto 1 mol of a diamine of the formula $$R—NH—(CH_2)_k—NH_2$$

wherein R is a member having from 8 to 24 carbon atoms selected from the group consisting of alkyl and alkenyl and k is an integer from 2 to 6, and (2) hydroxyalkyl amines of the formula

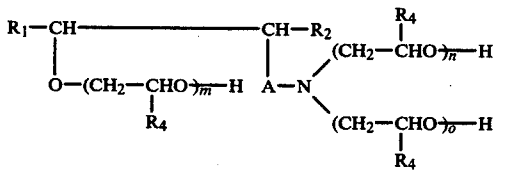

wherein $R_1$ is alkyl having 1 to 16 carbon atoms, $R_2$ is a member selected from the group consisting of hydrogen and alkyl having 1 to 16 carbon atoms, and the sum of the carbon atoms in $R_1+R_2$ is from 6 to 20 with the proviso that when $R_2$ is H, $R_1$ is alkyl having 6 to 16 carbon atoms, $R_4$ is a member selected from the group consisting of hydrogen and methyl, m, n and o represent integers from 0 to 3 and A is a bridging bond selected from the group consisting of:

(a)

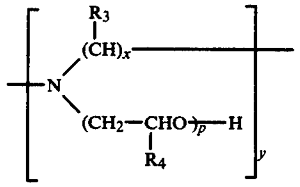

-continued (b)

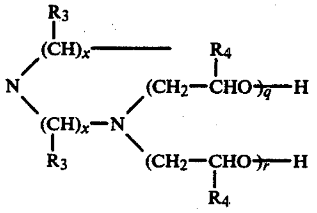

and (c)

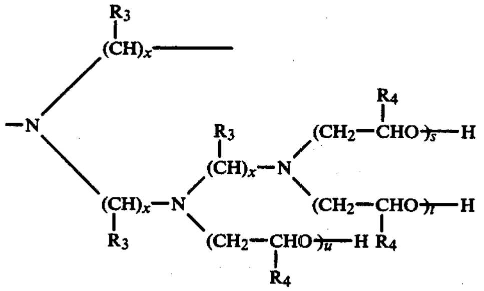

wherein $R_3$ is a member selected from the group consisting of hydrogen and methyl, x is an integer from 2 to 6, y is an integer from 1 to 3, p, q, r, s, t, and u represent integers from 0 to 3, with the proviso that the sum of m to u does not exceed 4, and (C) water.

2. Stable, pumpable aqueous suspensions having a pH of between 7 and 12 of water-insoluble, calcium-binding aluminosilicates suitable as stock suspensions consisting essentially of:

(A) from 20% to 55% by weight on the anhydrous basis of at least one finely-divided, water-insoluble silicate compound having an average particle size in the range of from 0.01μ to 100μ and a calcium-binding power of from 50 to 200 mg CaO/gm of anhydrous substance when measured at 22° C. by the Calcium Binding Power Test Method described in the specification and having the formula, combined water not shown $$(M_2O)_x.Me_2O_3.(SiO_2)_y$$

wherein M is a cation selected from the group consisting of sodium, potassium and lithium, x is a number from 0.7 to 1.5, Me is a member selected from the group consisting of aluminum and boron, and y is a number from 0.8 to 6, (B) from 0.2% to 5% by weight of at least one dispersing agent hydroxyalkyl amine of the formula

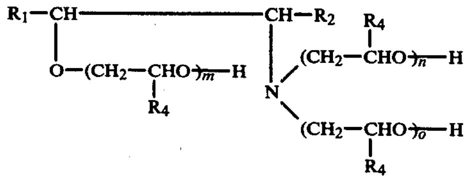

wherein $R_1$ and $R_2$ are alkyl having 1 to 16 carbon atoms and the sum of the carbon atoms in $R_1+R_2$ is from 6 to 18, $R_4$ is a member selected from the group consisting of hydrogen and methyl, m, n and o represent integers from 0 to 3 and the sum of n+o corresponds at least to the value 1.

3. The aqueous suspension of claim 1 wherein said silicate compound is crystalline.

4. The aqueous suspension of claim 3 wherein said crystalline silicate compound has the following interference lines in the x-ray diffraction diagrams as d-values in Å obtained with Ca-$K_\alpha$ radiation: 4.1, 3.68, 3.38, 3.26, 2.96, 2.73, 2.60.

5. The aqueous suspension of claim 3 wherein said crystalline silicate compound has the following interference lines in the x-ray diffraction diagrams as d-values in Å obtained with Ca-$K_\alpha$ radiation: 4.4, 3.8, 2.88, 2.79, 2.66.

6. The aqueous suspension of claim 1 wherein said silicate compound has a calcium-binding power of from 100 mg to 200 mg CaO/gm of anhydrous active substance.

7. The aqueous suspension of claim 1 wherein said silicate compound is present in an amount of from 25% to 40% by weight on the anhydrous basis and component B is present in an amount of from 0.3% to 4% by weight.

8. The aqueous suspension of claim 1 wherein component B is the addition product of 1 to 3 mols of an alkylene oxide selected from the group consisting of ethylene oxide and propylene oxide onto 1 mol of N-mono-($C_{10}$-$C_{18}$-alkyl)-1,3-propane diamine.

9. The aqueous suspension of claim 1 wherein component B is the addition product of 1 to 3 mols of ethylene oxide onto the reaction product of 1 mol of N-mono-($C_{10}$-$C_{16}$-alkyl)-1,3-propane diamine with 1 to 3 mols of ε-caprolactam.

10. The aqueous suspension of claim 1 wherein component B is a hydroxyalkyl amine of component B-2 with a turbidity point in water of below 50° C.

11. The aqueous suspension of claim 1 wherein component B is a hydroxyalkyl amine of the formula

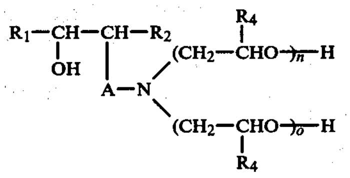

wherein $R_1$ is an alkyl having 1 to 16 carbon atoms, $R_2$ is a member selected from the group consisting of hydrogen and alkyl having 1 to 16 carbon atoms and the sum of the carbon atoms in $R_1$ and $R_2$ is from 6 to 20 with the proviso that when $R_2$ is hydrogen, the alkyl of $R_1$ has 8 to 16 carbon atoms, $R_4$ is a member selected from the group consisting of hydrogen and methyl, A stands for one of the groups (b), (c) or (d) of claim 1, and n and o, as well as p to u in A represent the integers 0 and 1.

12. The aqueous suspension of claim 11 wherein the sum of the carbon atoms in $R_1$ and $R_2$ is from 8 to 18.

13. The aqueous suspension of claim 11 wherein $R_4$ is hydrogen.

14. The aqueous suspension of claim 11 wherein component B is the reaction product of a terminal $C_{12}$-$C_{14}$ epoxyalkane and hexamethylene diamine in substantially equimolar amounts.

15. In the process for the preparation of a powdery, tricklable washing and cleansing agent composition which comprises spray-drying an aqueous slurry of the individual constituents of a washing and cleansing agent composition including builders and surface-active compounds and recovering said powdery, tricklable washing and cleansing agent composition, the improvement consisting of employing the aqueous suspension of claim 1 in the preparation of said aqueous slurry.

16. In the process for the preparation of a granular, tricklable washing and cleansing agent composition which comprises spraying an aqueous slurry of some of the ingredients onto a moving bed of the remaining ingredients in a dehydrated form, and recovering a granular tricklable washing and cleansing agent composition, the improvement consisting of employing the aqueous suspension of claim 1 in the preparation of said aqueous slurry.

17. The aqueous suspension of claim 2 wherein the sum of n+o is between 2 and 5.

18. The aqueous suspension of claim 2 wherein $R_4$ is hydrogen.

19. Stable, pumpable aqueous suspensions having a pH of between 7 and 12 of water-insoluble, calcium-binding aluminosilicates suitable as stock suspensions consisting essentially of:

(A) from 20% to 55% by weight on the anhydrous basis of at least one finely-divided, water-insoluble silicate compound having an average particle size in the range of from 0.01μ to 100μ and a calcium-binding power of from 50 to 200 mg CaO/gm of anhydrous substance when measured at 22° C. by the Calcium Binding Power Test Method described in the specification and having the formula, combined water not shown $$(M_2O)_x.Me_2O_3.(SiO_2)_y$$

wherein M is a cation selected from the group consisting of sodium, potassium and lithium, x is a number from 0.7 to 1.5, Me is a member selected from the group consisting of aluminum and boron, and y is a number from 0.8 to 6, (B) from 0.2% to 5% by weight of at least one hydroxyalkyl amine of the formula

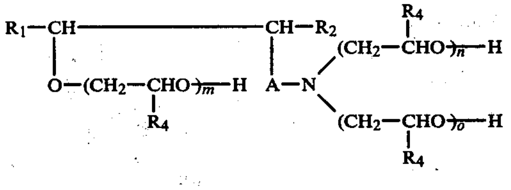

wherein $R_1$ is alkyl having 1 to 16 carbon atoms, $R_2$ is a member selected from the group consisting of hydrogen and alkyl having 1 to 16 carbon atoms, and the sum of the carbon atoms in $R_1+R_2$ is from 6 to 20 with the proviso that when $R_2$ is H, $R_1$ is alkyl having 6 to 16 carbon atoms, $R_4$ is a member selected from the group consisting of hydrogen and methyl, m, n and o represent integers from 0 to 3 and A is a bridging bond selected from the group consisting of:

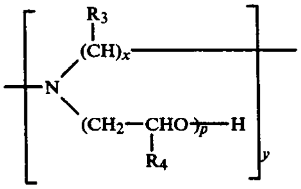

(a)

-continued
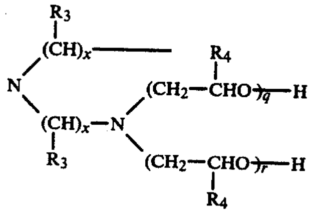
(b)
and
-continued
(c)
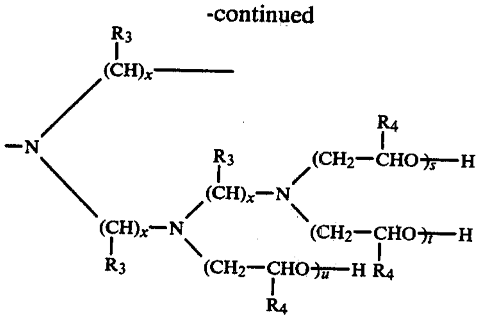
wherein $R_3$ is a member selected from the group consisting of hydrogen and methyl, x is an integer from 2 to 6, y is an integer from 1 to 3, p, q, r, s, t, and u represent integers from 0 to 3, with the proviso that the sum of m to u does not exceed 4, and
(C) water.
* * * * *

UNITED STATES PATENT AND TRADEMARK OFFICE

CERTIFICATE OF CORRECTION

PATENT NO. : 4,179,393

DATED : December 18, 1979

INVENTOR(S) : HANS ANDREE ET AL.

It is certified that error appears in the above—identified patent and that said Letters Patent is hereby corrected as shown below:

Column 11, line 67: "difficulty" should read -- difficultly --.

Column 24, line 48: "luminosilicates" should read -- aluminosilicates --.

line 51: "aluminoilicate" should read -- aluminosilicate --.

Column 25, line 16: "14) α-12- + DEA" should read -- 14) α-12-14+DEA --.

line 19: "17) α-15-18 + EG" should read -- 17) α-15-18 + EG + 1 EO --.

line 20: Delete "(4) 1 EO".

line 25: "(12) 1-11-14" should read -- (12) i-11-14 --.

Table 1, below column 6: Delete "Water Addition".

below column 5: insert -- Water Addition --.

UNITED STATES PATENT AND TRADEMARK OFFICE

CERTIFICATE OF CORRECTION

PATENT NO. : 4,179,393

DATED : December 18, 1979

INVENTOR(S) : HANS ANDREE ET AL.

It is certified that error appears in the above—identified patent and that said Letters Patent is hereby corrected as shown below:

Column 25, Table 1, below Component B: "i-11- + EDA" should read -- i-11-14 + EDA.

Signed and Sealed this

*Tenth* Day of *August 1982*

[SEAL]

*Attest:*

GERALD J. MOSSINGHOFF

*Attesting Officer* *Commissioner of Patents and Trademarks*